United States Patent [19]

Yamamoto et al.

[11] Patent Number: 4,946,888
[45] Date of Patent: Aug. 7, 1990

[54] HIGH-HARDNESS RUBBER COMPOSITION

[75] Inventors: Keisaku Yamamoto; Yoshio Tanimoto; Isao Takano, all of Chiba, Japan

[73] Assignee: Sumitomo Chemical Company Limited, Osaka, Japan

[21] Appl. No.: 437,607

[22] Filed: Nov. 17, 1989

[30] Foreign Application Priority Data

Mar. 9, 1989 [JP] Japan ................................. 64-58432

[51] Int. Cl.$^5$ ........................... C08K 3/00; C08K 3/04; C08L 9/00; C08L 23/26
[52] U.S. Cl. ................................. 524/526; 525/192; 525/196; 525/237; 525/197; 523/351
[58] Field of Search ................ 525/192, 237; 524/526; 523/351

[56] References Cited

U.S. PATENT DOCUMENTS

| | | | |
|---|---|---|---|
| 3,359,221 | 12/1967 | Schoenbeck | 525/192 |
| 3,451,962 | 6/1969 | Auler et al. | 260/33.6 |
| 3,891,724 | 6/1975 | Yaeda et al. | 260/889 |
| 4,089,820 | 5/1978 | Wright | 260/5 |
| 4,137,350 | 1/1979 | Blaskiewcz et al. | 428/31 |

FOREIGN PATENT DOCUMENTS

| | | |
|---|---|---|
| 910520 | 9/1972 | Canada . |
| 46190 | 8/1971 | Japan . |
| 61-143458 | 7/1986 | Japan . |
| 1212964 | 11/1970 | United Kingdom . |
| 1541664 | 3/1979 | United Kingdom . |

Primary Examiner—Carman J. Seccuro
Attorney, Agent, or Firm—Cushman, Darby & Cushman

[57] ABSTRACT

A high-hardness rubber composition which is obtained by vulcanizing an unvulcanized rubber composition comprising an unvulcanized ethylene.α-olefin rubber composition (A) comprising 100 parts by weight of an ethylene.α-olefin copolymer rubber, 60–150 parts by weight of a reinforcing agent and 0–70 parts by weight of a softener;

5–40 parts by weight of a solid diene rubber (B) based on 100 parts by weight of said ethylene.α-olefin copolymer rubber; and 4–15 parts by weight of sulfur (C) based on 100 parts by weight of said ethylene.α-olefin copolymer rubber, wherein said unvulcanized rubber composition is obtained by adding said solid diene rubber (B) and said sulfur (C) to said unvulcanized ethylene.α-olefin rubber composition (A).

5 Claims, No Drawings

HIGH-HARDNESS RUBBER COMPOSITION

The present invention relates to a rubber composition high in hardness. More specifically, it relates to high-hardness rubber composition comprising an ethylene.α-olefin copolymer rubber, which is excellent in heat resistance and weather resistance and besides provides an extruded article having a smooth surface.

The present rubber composition can be used for automobile parts, industrial parts, construction materials and other various applications.

The present inventors already invented a high-hardness rubber composition comprising an ethylene.α-olefin copolymer rubber, a liquid diene rubber and a large amount of sulfur, which was superior in mixing processability and excellent in properties of vulcanized rubber compositions and further provided an extruded articles having a smooth surface. (Refer to Japanese Patent Publication (Kokai) Nos. 60-262842 and 62-135552 and U.S. Pat. No. 4,708,992.) However, since that composition employs a liquid diene rubber which is a viscous liquid, it still has a problem on handling of the liquid diene upon weighing and mixing processes. Thus, there is a need for improvement.

On the other hand, a high-hardness rubber composition comprising an ethylene.α-olefin copolymer rubber, a solid diene rubber and a large amount of sulfur is suggested by, for example, U.S. Pat. No. 4,137,350. However, the United States Patent fails to disclose an improvement in the surface of extruded articles. Japanese Patent Publication (Kokai) No. 61-143458 by the present inventors deals with an improvement in extrusion processability such as feedability to an extruder. However, it also fails to disclose an improvement in the surface of extruded articles.

It is an object of the present invention to provide a rubber composition high in hardness and capable of providing an extruded article having a smooth surface, without the use of a liquid diene rubber which is hard to handle.

As a result of intensive researches of the present inventors to accomplish the above object, the present invention has been completed.

The present invention relates to a rubber composition high in hardness which is obtained by vulcanizing an unvulcanized rubber composition which comprises an unvulcanized ethylene.α-olefin rubber composition (A) comprising 100 parts by weight of an ethylene.α-olefin copolymer rubber, 60–150 parts by weight of a reinforcing agent and 0–70 parts by weight of a softener; 5–40 parts by weight of a solid diene rubber (B) based on 100 parts by weight of said ethylene.α-olefin copolymer rubber; 4–15 parts by weight of sulfur (C) based on 100 parts by weight of said ethylene.α-olefin copolymer rubber, wherein said unvulcanized rubber composition is obtained by adding said solid diene rubber (B) and said sulfur (C) to said unvulcanized ethylene.α-olefin rubber composition (A).

Hereinafter, the present invention will be set forth in detail.

The unvulcanized ethylene.α-olefin rubber composition (A) used in the present invention is an unvulcanized rubber composition which comprises 100 parts by weight of an ethylene.α-olefin copolymer rubber, 60–150 parts by weight of a reinforcing agent and 0–70 parts by weight of a softener.

The ethylene.α-olefin copolymer rubber is a copolymer which comprises ethylene, at least one α-olefin and at least one non-conjugated diene. The α-olefin includes propylene, 1-butene, 1-pentene, 1-hexene and the like. The non-conjugated diene includes dicyclopentadiene, ethylidenenorbornene, 1,4-hexadiene, methyltetrahydroindene, methylnorbornene and the like.

The reinforcing agent includes carbon black, anhydrous silica, hydrous silica, surface-treated calcium carbonate, surface-treated clay and the like. These reinforcing agents may be used alone or in combination thereof. However, carbon black is preferred from the viewpoints of properties of the vulcanized rubber and processability of the unvulcanized rubber.

The content of the reinforcing agent is 60–150 parts by weight based on 100 parts by weight of the ethylene.α-olefin copolymer rubber. If the content is less than said range, processability of the unvulcanized rubber is inferior. If the content is more than said range, properties of the vulcanized rubber are inferior.

The softener includes aromatic process oils, naphthenic process oils and paraffinc process oils. Naphthenic process oils and paraffinic process oils are preferred from the point of view that they provide less stain for such materials as coated steel plates and plastics used in contact with the vulcanized rubber composition. As the softener, a plasticizer for polyvinyl chloride such as DOS (di-(2-ethylhexyl)sebacate) and DOP (di-(2-ethylhexyl)phthalate) may be used.

The content of the softener is 0–70 parts by weight based on 100 parts by weight of the ethylene.α-olefin copolymer rubber. If the content exceeds said range, hardness of the final vulcanized rubber composition becomes difficult to enhance.

The solid diene rubber (B) used in the present invention (hereinafter referred to as "diene rubber") includes natural rubber (NR), polyisoprene rubber (IR), polybutadiene rubber (BR), styrene-butadiene rubber (SBR) and acrylonitrile butadiene rubber (NBR), but is not limited thereto. Taking into account roll processability of the unvulcanized rubber composition as well as large change in hardness of the final vulcanized rubber composition depending upon temperature, the diene rubber is preferably one in which its butadiene content is 50% by weight or more. Further, from the viewpoint of strength and hardness of the final vulcanized rubber composition, the diene rubber is preferably one in which 1,2 bonds constitute 40% or more of the bonds of the butadiene portions thereof. Most preferably, the diene rubber is one in which its butadiene content is 50% or more, 1,2 bonds constitute 40% or more of the bonds of the butadiene portions thereof, and the ratio of weight-average molecular weight to number-average molecular weight (weight-average molecular weight/number-average molecular weight, hereinafter referred to as "Q") is 2 or less, since it provides the final vulcanized rubber composition with higher hardness. Preferable examples of the diene rubber are polybutadiene rubber and styrene-butadiene rubber.

In the present invention, Q is obtained from a molecular weight distribution which is determined by a liquid chromatography at 40° C. using tetrahydrofuran (THF) as mobile phase.

The amount of the diene rubber (B) to be added is 5–40 parts by weight, preferably 10–30 parts by weight, most preferably 13–27 parts by weight, based on 100 parts by weight of the ethylene.α-olefin copolymer rubber. If the amount is less than said range, hardness of the final vulcanized rubber composition is not sufficiently increased. If the amount is more than said range, properties of the vulcanized rubber such as elongation and strenght are lowered although hardness is increased.

In the present invention, the diene rubber (B) may be used alone or in the state that the reinforcing agent, the softener or the like is added thereto. In the latter case, it is preferable that the reinforcing agent is added thereto in such a way that the ratio by weight of the reinforcing agent added to the diene rubber to the diene rubber is less than the ratio by weight of the reinforcing agent added to the ethylene. α-olefin colopymer rubber to the ethylene.α-olefin copolymer rubber and in such an amount that the reinforcing agent added to the diene rubber is 10–80 parts by weight based on 100 parts by weight of the diene rubber. It is preferable that the softener is added thereto in an amount of 0–50 parts by weight based on 100 parts by weight of the diene rubber.

The sulfur (C) used in the present invention may be powdered sulfur or insoluble sulfur.

The amount of the sulfur (C) to be added is 4–15 parts by weight, preferably 5–12 parts by weight, more preferably 5–10 parts by weight, based on 100 parts by weight of the ethylene.α-olefin copolymer rubber. If the amount is less than said range, hardness of the final vulcanized rubber composition is not sufficiently increased. If the amount is more than said range, properties of the vulcanized rubber composition such as elongation are inferior and appearance tends to deteriorate due to blooming.

Further, in order to impart the sulfur (C) to the unvulcanized rubber composition, may be used a sulfur donor such as morpholiine disulfide, alkylphenol disulfide and N'-dithio-bis(hexahydro 2H-azepinone-2).

The especially important point of the present invention is that the diene rubber (B) and the sulfur (C) are added to the unvulcanized ethylene.α-olefin rubber composition (A) which is specifically formulated by the present invention. In general, in order to make the surface of an extruded rubber composition smooth, a reinforcing agent must be uniformly dispersed throughout the rubber composition without maldistribution. However, in the rubber composition which contains both an ethylene.α-olefin copolymer rubber and a diene rubber as constituents, the reinforcing agent could not be uniformly dispersed. More specifically, since there was a big difference in capacity for containing the reinforcing agent between the ethylene.α-olefin copolymer rubber and the diene rubber, the reinforcing agent added was maldistributed to the diene rubber more than the ethylene. α-olefin copolymer rubber, and thus the surface of the extruded rubber composition could not be smooth.

As a result of noticing such a phenomenon, the present inventors have found out the present invention which can uniformly disperse the reinforcing agent in the rubber composition containing both ethylene. α-olefin copolymer rubber and diene rubber, and thus have realized a smooth surface of extruded rubber compositions.

Mixing the ethylene.α-olefin rubber composition (A) with the diene rubber (B) can be conducted by, for example, either of the following two processes:

(1) a process in which the ethylene.α-olefin copolymer rubber, the reinforcing agent and the softener are mixed in an intensive mixer and/or a mixing roll, and then the obtained ethylene.α-olefin rubber composition (A) is mixed with the diene rubber (B) in another intensive mixer and/or another mixing roll; and (2) a process in which after an ethylene.α-olefin rubber composition (A) is obtained in an intensive mixer and/or a mixing roll, the composition (A) is continuously mixed with the diene rubber (B) in the same intensive mixer and/or the same mixing roll by feeding the (B) thereto without discharging the (A) therefrom.

When the ethylene.α-olefin rubber composition (A) and the diene rubber (B) are mixed, it is preferable that mixing time is short and rotation of rotor or roll is low.

The diene rubber (B) may be added to the ethylene.α-olefin rubber composition (A) in the form of an unvulcanized diene rubber composition which has previously been obtained by mixing a diene rubber (B) with a reinforcing agent, a softener or the like in an intensive mixer and/or a mixing roll.

In the present invention, when the ethylene.α-olefin rubber composition (A) or the unvulcanized diene rubber composition is obtained, various additives known in the rubber industry such as fillers, processing aids, antifoaming agents, zinc oxide, stearic acid, vulcanization accelerators and antioxidants may be added thereto. Further, when the ethylene.α-olefin rubber composition (A) and the diene rubber (B) are mixed, not only an additional reinforcing agent or softener but also various additives known in the rubber industry such as fillers, processing aids, antifoaming agents, zinc oxide, stearic acid, vulcanization accelerators, vulcanizing agents and antioxidants may be added thereto.

The sulfur (C) may be mixed at the same time when the diene rubber (B) is mixed with the ethylene.α-olefin rubber composition (A). However, in view of scorching of unvulcanized rubber compositions, the sulfur (C) is preferably mixed at a relatively low temperature in an intensive mixer and/or a mixing roll after the ethylene.α-olefin rubber composition (A) and the diene rubber (B) are mixed. At this stage, not only an additional reinforcing agent or softener but also various additives known in the rubber industry such as fillers, processing aids, antifoaming agents, zinc flower, stearic acid, vulcanization-accelerators, vulcanizing agents and antioxidants may be added thereto.

The high-hardness rubber composition of the present invention may be obtained by use of any vulcanization methods including press vulcanization, steam vulcanization, injection molding, hot air continuous vulcanization, UHF continuous vulcanization, LCM continuous vulcanization, PCM continuous vulcanization and a continuous vulcanization methods consisting of the combination of two or more of these methods.

The high-hardness rubber composition of the present invention can be applied to a wide range of uses including automobile parts, industrial parts and construction materials. Examples of the uses are automobile parts such as packings, hoses, channel rubber, glass run rubber, weatherstrips, hard solid rubber portions in composites of a soft solid rubber and a hard solid rubber, solid rubber portions in composites of a solid rubber and a sponge rubber which are applied to door seals or trunk seals, mudguards, weatherstrips etc.; industrial parts such as rubber rolls, sealing materials and packing, etc.; and construction materials such as setting blocks, rubber tiles, gaskets, etc.

Hereinafter, the present invention will be set forth by way of examples, but the present invention is not limited only to the examples.

In the examples, "Q" of diene rubbers was obtained from a molecular weight distribution which was measured at 40° C. by HLC-802UP manufactured by TOYO SODA Co., Ltd. using columns of $10^3$, $10^4$, $10^6$ and $10^7$ as separation columns, a refractometer as detector and tetrahydrofuran (THF) as mobile phase.

EXAMPLES 1–6 AND COMPARATIVE EXAMPLES 1–3

In Examples 1–6, an unvulcanized ethylene.α-olefin rubber composition (A) and a diene rubber (B) or an unvulcanized diene rubber composition were respectively prepared in accordance with the formulation and the mixing process and conditions shown in Table 1. Mixing of the ethylene.α-olefin rubber composition (A) with the diene rubber (B) or the unvulcanized diene rubber composition was conducted in accordance with the process and conditions shown in Table 1. Further, to the resultant mixture, sulfur (C) and a vulcanization-accelerator were added in accordance with the amount and the process and conditions shown in Table 1. The unvulcanized rubber composition thus obtained was subjected to a measurement of Mooney viscosity in accordance with JIS K 6300 and an extrusion process under the below-mentioned conditions to obtain a ribbon-shaped extruded article. One of the sides of the extruded article was visually observed, and protrusions of about 0.5–1 mm thereon were counted to determine the number of protrusions per meter.

Further, the unvulcanized rubber composition was vulcanized by a hot press at 160° C. for 20 minutes to obtain a vulcanized rubber composition of 2 mm thickness. Properties of the vulcanized rubber were evaluated in accordance with JIS K 6301. The results are shown in Table 3.

Conditions on extrusion process:
Extruder: screw diameter, 45 mm; and ratio of length to diameter of screw, 16.
Screw rotation: 30 rpm.
Die: Die of the type of ribbon of 2 mm×20 mm.
Temperature: die, 80° C; and cylinder, 60° C.

In Comparative Examples 1–3, unvulcanized rubber compositions were prepared in accordance with the formulation and the mixing process and conditions shown in Table 2. Further, the unvulcanized rubber compositions were vulcanized and the vulcanized rubber composition were evaluated in the same manner as in the Examples 1–6. The results are shown in Table 3.

It is understood from Examples 1–6 that the composition of the present invention provides a rubber composition which not only is high in hardness but also provides an extruded article having a smooth surface.

On the other hand, it can be seen from Comparative Examples 1–3 that the rubber composition which does not meet the present requirement that diene rubber (B) and sulfur (C) are added to unvulcanized ethylene.α-olefin rubber composition (A) is inferior in hardness or smoothness of the surface of extruded articles.

As described above in detail, the present invention provides a rubber composition which is high in hardness and capable of providing an extruded article having a smooth surface, without use of a liquid diene rubber which is troublesome upon handling.

We claim:

1. A rubber composition which is obtained by vulcanizing an unvulcanized rubber composition comprising
    an unvulcanized ethylene.α-olefin rubber composition (A) comprising 100 parts by weight of an ethylene.α-olefin copolymer rubber, 60–150 parts by weight of a reinforcing agent and 0–70 parts by weight of a softener;
    5–40 parts by weight of a solid diene rubber (B) based on 100 parts by weight of said ethylene.α-olefin copolymer rubber; and
    4–15 parts by weight of sulfur (C) based on 100 parts by weight of said ethylene.α-olefin copolymer rubber,
    wherein said unvulcanized rubber composition is obtained by adding said solid diene rubber (B) and said sulfur (C) to said unvulcanized ethylene.α-olefin rubber composition (A).

2. A rubber composition according to claim 1, wherein the solid diene rubber (B) is one in which its butadiene content is 50% by weight or more and 1,2bonds constitute 40% or more of the bonds of the butadiene portions.

3. A rubber composition according to claim 2, wherein the solid diene rubber (B) is one in which the ratio of weight-average molecular weight to number-average molecular weight is 2 or less.

4. A rubber composition according to any one of claims 1, 2 or 3, wherein the solid diene rubber (B) is styrene-butadiene rubber.

5. A rubber composition according to claim 1, wherein said solid diene rubber (B) is in the form of an unvulcanized diene rubber composition which comprises a reinforcing agent and a softener in addition to 5–40 parts by weight of a solid diene rubber (B) based on 100 parts by weight of said ethylene.α-olefin copolymer rubber.

* * * * *